United States Patent Office 3,511,143
Patented May 12, 1970

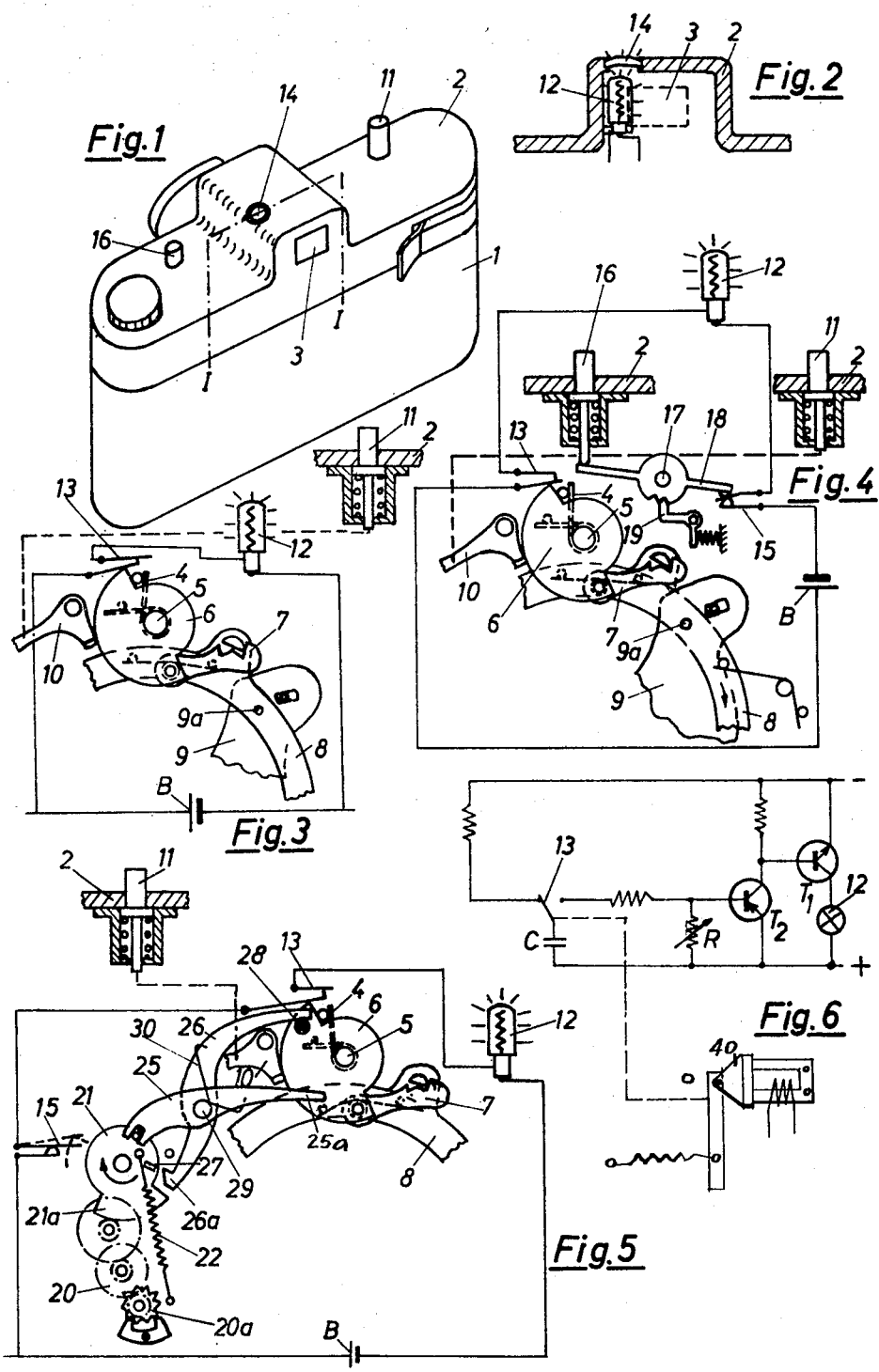

3,511,143
PHOTOGRAPHIC CAMERA HAVING AN ELECTRONIC TIMING DEVICE AND AN EXPOSURE SIGNAL MEANS
Waldemar T. Rentschler, Calmbach, Black Forest, Germany, assignor to Prontor-Werk Alfred Gauthier, G.m.b.H., Calmbach, Black Forest, Germany, a corporation of Germany
Filed June 6, 1967, Ser. No. 644,766
Int. Cl. G03b 7/08
U.S. Cl. 95—10      15 Claims

ABSTRACT OF THE DISCLOSURE

A photographic camera having a shutter system controllable as a function of lighting conditions by a timing device working on an electronic basis with the aid of a photo resistor. A signal light is arranged on the camera to light up automatically at the end of the exposure process. The signal light is switched on by means of a contact switch actuated by the part of the camera which causes the shutter system to close after having been fully open.

---

The invention relates to a photographic camera with a shutter system which is controllable, depending on lighting, by means of a timing device working on electronic basis with the aid of a photo resistor.

Photographic cameras of the above kind provide the possibility of taking pictures even at low lighting intensity with automatic runoff of the exposure time whereby, time spans in the order of several minutes can result, depending on the prevailing lighting conditions. Taking such pictures is difficult for the photographer because it requires that his concentration be directed to the sound the shutter makes when closing, to determine when the exposure is concluded or when the shutter has reached its closed position again after its fully open position. Only then can the photographer remove the camera from its picture taking location or prepare for a new exposure without detrimental consequences for the exposure.

As already mentioned, the closing noise of the mechanical shutter that is not always clearly audible furnishes, in previously known cameras equipped with electronic shutters, the only signal from which the photographer can deduce that the exposure has been concluded. Where exposures of ultra-long duration are involved which may not be recognizable by the photographer in advance and demands that his entire attention be directed to this process, there is produced a feeling of uncertainty as to whether the click indicating the closing of the shutter or another sound caused by other motional processes was actually heard. In the latter case, the consequence would be a spoiled picture and, beyond this, under certain circumstances, disadvantages for the shutter mechanism.

It is an object of the present invention to indicate clearly to the user of a camera with an automatically controlled electronic shutter, the end of the exposure time regardless of the duration of the exposure time by the use of relatively simple structural means.

To achieve this and other objects, the invention provides for the arrangement of a signal light which lights up automatically at the end of the exposing process. This way, the problems of the photographer removing the camera from its location without knowing that the exposure has been concluded is eliminated even where ultra-long exposure times resulting from the lighting conditions are involved. Thus, the signal indicating the conclusion of the exposing process gives the photographer the same feeling of assurance that he may get from shutters with clearly audible shutter click.

A particularly advantageous embodiment of this invention requiring a minimum of structural expense, yet assuring maximum operating safety, is achievable wherein the signal light is switched on by means of a contact switch actuated by a part which causes the shutter system to close after the fully open time. Further, the actuation of the contact switch closing the circuit of the signal light may be accomplished by the driving part of the shutter system or by a magnet armature of the electronic timing device.

For limiting in simple manner the light-up period of the indicating device to an optimum time interval required to preceive it clearly, the invention further proposes that besides the contact switch, an interrupting switch be disposed in the circuit of the signal light.

According to a further embodiment of the invention having the purpose of giving the photographer the opportunity to end the signal individually, the interrupting switch can be operable by means of a clearing key to which a switching element is assigned to keep the switch in contact-making position. The switching element is so disposed with respect to the driving part of the shutter system that it automatically closes the interrupting switch when winding the shutter.

One method of making the signal independent of manual actuation consists in providing a mechanical movement, releasable by the driving part of the shutter system, to determine the time interval during which the signal light lights up. To make this device as simple to handle as possible and also independent of the photographers attention, it is further proposed according to the invention to provide between the shutter drive and the mechanical movement a power transmission member, designed as a lever or the like, which when winding the shutter serves the purpose of bringing the mechanical movement and its drive into the wound position. An electrical circuit can also be provided to determine the light-up time.

Various other objects, features and advantages of this invention will be apparent from the following specification, claims and the drawings appended hereto wherein:

FIG. 1 is a perspective rear view of a camera equipped with the signaling device according to this invention.

FIG. 2 is a fragmentary cross-sectional view of the upper portion of the housing cover of the camera of FIG. 1 that serves to accommodate the view finder taken along lines I—I of FIG. 1.

FIG. 3 is a fragmentary partially diagrammatic view of a mechanical shutter drive of the camera of FIG. 1 in the initial position corresponding to the closed position of the shutter blades, with signal light lighting up.

FIG. 4 is a view similar to FIG. 3 with an additional, manually operable interrupting switch means causing the signaling device to go out.

FIG. 5 is a view similar to FIG. 3 with a mechanical movement to determine the length of time the signal light shines.

FIG. 6 is a diagrammatic representation of an electric circuit for determining the period that the signal light is on.

Referring now to the drawings, there is illustrated a camera having a housing, designated by the reference numeral 1, and a housing cover 2 accommodating a viewfinder 3. The camera is also provided with a shutter system which is controllable according to lighting conditions by means of timing device working on electronic basis with the aid of a photoresistor. The camera is equipped with a sliding crank type drive shutter system in which a driving disk 6, under the effect of a drive spring 4, is mounted on a winding shaft 5 for corotation and acts upon a shutter blade ring 8 by means of a drive pawl 7. The shutter blade ring 8 is in articulated connection with fixedly guided shutter blades 9, only one of which is shown, that serve to open and close the aperture of the objective by means of a pin 9a for each blade. Assigned to the drive disk 6 for keeping it in the wound position is a locking lever 10 which, by means of conventional transmission members merely indicated in FIG. 3 by dotted lines, is in effective connection with a camera release 11.

As may further be seen from FIG. 3, a battery B which serves to supply power to the switching device of the electronic timing device, also has in its circuit a signal light 12 and a contact switch 13 which is formed of spring tongues. The switch 13 is provided for the purpose of turning the signal light 12 on, and is so disposed with respect to the drive disk 6 that contact is made automatically at the latest when the drive disk 6 has reached the position corresponding to the closed position of the shutter blades 9.

The signal light 12 can be accommodated in the area of the viewfinder 3 and a viewing window 14 enabling light rays to escape can be provided in the housing cover 2 enclosing the eye-piece. This is for the purpose of indicating to the photographer, when he looks through the finder 3 as well as independently thereof, the conclusion of the exposing process.

The embodiment of FIG. 4 is identical in design and mode of operation with the arrangement according to FIG. 3, and has an additional device provided by means of which the lighting of the signal light 12 can be ended manually. For this purpose, there is provided in the circuit of battery B, besides the contact switch 13, an interrupting switch 15 which can be operated indirectly or directly by an additional clearing key 16 protruding out of the shutter housing cover 2. For operating the interrupting switch 15 directly, the switch 15 may be disposed in the range of motion of the clearing key 16. For operating the interrupting switch 15 indirectly, a dual-armed lever 18 is provided which is pivoted on a fixed shaft 17 so that one arm of the lever 18 is located in the range of motion of the key 16 and the other arm can bear down on a contact making spring tongue of the interrupting switch 15 which is the normal position that the interrupting switch 15 assumes when the signaling device lights up.

When the conclusion of the exposing process has been indicated by lighting of the signal light 12, the clearing key 16 is then actuated so that the contact in the interrupting switch 15 is broken and the circuit of the signal light 12 is interrupted causing the light 12 to go out. A spring detent system 19 serves to hold the arm 18 in the open contact position now assumed. When the driving disk 6 of the shutter is again brought into the wound position, one part of the driving disk 6 rests against the lever 18, so that the lever 18 changes back into the contact making position shown in FIG. 4.

In FIG. 5 there is illustrated a mechanical device controlled by the driving disk 6 of the shutter adapted to cause the signal light 12 to go out automatically after a certain time interval. For this purpose a gear movement 20 is provided that is designed in the manner of a time regulating movement already in general use for shutters and cooperates for the purpose of synchronous run-off with an escapement-controlled ratchet wheel 20a. Geared to the gear movement 20 is winding disk 21, under the influence of an extension spring 22, provided with a gear segment 21a which disk cooperates with a winding lever 25 pivoted on a fixed pin 29.

Mounted on the same shaft 29 with the winding lever 25 is locking lever 26 of a design similar to the winding lever 25. The locking lever 26 has one end cooperating with a locking cam 27 fixedly mounted on the winding disk 21 and has its other end cooperating with a drive pin 28 attached to the drive disk 6. The arrangement of the drive pin 28 is such that during the winding process of the camera and the counterclockwise rotary motion executed by the drive disk 6, the pin strikes against the arm 25a of winding lever 25 and through it automatically causes the winding disk 21 of the gear movement to move into the wound position against the force of spring 22. Under the effect of a wound spring 30 located on the pivot pin 29, a hook-shaped end 26a of the locking lever 26 engages the locking cam 27 after the winding disk 21 has reached the wound position and thus prevents the gear movement 20 from running off prematurely.

As soon as the drive disk 6 of the shutter is released for run-off after being unlocked by the locking lever 10 or by the camera release 11 in effective connection with it, and the drive disk 6 has rotated far enough under the influence of the drive spring 4 for the shutter blades 9 in driving connection with the drive ring 8 to have resumed their closed position, the drive pin 28 strikes against the locking lever 26. Simultaneous with the disk 6 making contact at the switch 13, resulting in the signal light 12 lighting up, the hook-shaped lever end 26a disengages from the locking cam 27, setting into motion the gear movement 20 determining the length of the light-up period. Under the influence of extension spring 22 the winding disk 21 now rotates in the direction of the arrow, whereby the edge of the winding segment 21a which leads in rotary direction strikes against one spring tongue of the interrupting switch 15 again interrupting the circuit of the signal light 12.

During the subsequent winding process, during which the drive disk 6 of the shutter is turned counterclockwise against the force of the spring 4, the drive pin 28 contacts the end of the winding lever 25 facing it, the consequence being that the lever 25 is turned clockwise so that the winding disk 21 is automatically returned into its wound position against the force of the extension spring 22.

FIG. 6 illustrates a wiring diagram to determine the light-up time of the signal light 12 which can be included in the circuit of the electronic timing device. Similar to the switching device for timing, this wiring diagram includes, besides the two transistors $T_1$ and $T_2$, a capacitor C and a resistor R serving to determine the time interval. In this electrical circuit there is, more over, the signal light 12, symbolically indicated in the wiring diagram of FIG. 6. The circuit is closed by a switch 13 which is operable either by the drive disk 6 of the shutter or else by the magnetic armature 40 of the electronic timing device of the camera. The actuation of the switch 13 closes the circuit serving to determine the light-up period thereby causing the signal light 12 to light up. The light continues to glow until capacitor C is discharged and transitor $T_1$ becomes non-conductive, which causes the signal light 12 to go out again.

The above described arrangement of a signal light is of significance for cameras of any kind in which the shutter run-off is controllable by an electronic timing device. It can be employed to the same advantage in all cameras, regardless whether they are equipped with a center type shutter of the design shown in the drawing, a slot type shutter or any other shutter system.

Having thus described my invention, I claim:

1. A photographic camera comprising a shutter system controllable as a function of lighting conditions by a timing device working on electronic basis with the aid of a photo resistor, a signal light arranged on said camera to light up automatically at the end of the exposing process, said signal light being switched on by means of a contact switch actuated by a part of said camera which causes said shutter system to close after the time of being fully open.

2. The photographic camera of claim 1 wherein said contact switch, closing the circuit of said signal light, is actuated by the driving part of said shutter system.

3. The photographic camera of claim 1 wherein said contact switch, closing the circuit of said signal light, is actuated by a magnetic armature of said electronic timing device.

4. The photographic camera of claim 2 wherein besides said contact switch an additional interrupting switch is disposed in the circuit of said signal light.

5. The photographic camera of claim 4 wherein said interrupting switch is operable by a clearing key operably connected to a switching element, said switching element being operably connected to said interrupting switch to keep said interrupting switch in contact making position, said switching element being disposed with respect to said driving part of said shutter system so that said switching element automatically closes said interrupting switch when the shutter is wound.

6. The photographic camera of claim 4 having a mechanical movement operably connected to actuate said interrupting switch, said mechanical movement being releasable by said driving part of said shutter system to determine the time interval during which said signal light lights up.

7. The photographic camera of claim 6 wherein a power transmission lever is provided between said shutter driving part and said mechanical movement, said power transmission lever being operably connected to said shutter driving part and said mechanical movement so that when winding the shutter said lever drives said mechanical movement and serves to bring said movement into the wound position.

8. The photographic camera of claim 1 wherein circuit means is provided to keep said light on for a predetermined interval after said contact switch is actuated, said circuit means comprising a first transistor in series with said light to control operating current through said light; a second transistor connected to said first transistor to control the conductivity thereof; resistor means connected to the base of said second transistor; a capacitor; and a charging circuit, said contact switch being connected to said charging circuit, said capacitor, and said resistor means to connect said capacitor to said charging circuit during exposure and to connect said capacitor to said resistor means at the end of the exposure process to control the conductivity of said second transistor and thereby the conductivity of said first transistor for a time interval determined by said capacitor and said resistor means.

9. A photographic camera comprising shutter means; electronic timing means operable to control said shutter means as a function of lighting conditions; a signal light arranged in circuit means on said camera to automatically indicate the end of the exposing process; and switch means in said circuit means to actuate said signal light to indicate the end of the exposing process, said switch means being operable by said shutter means when said shutter means closes after the time of being fully open.

10. The photographic camera of claim 9 wherein said switch means is actuated by a driving member of said shutter means.

11. The photographic camera of claim 10 wherein an interrupting switch is provided in said circuit means to deenergize said signal light after said switch means has closed.

12. The photographic camera of claim 11 wherein said interrupting switch is operably connected to switching element means for manual actuation of said interrupting switch, said switching element means being disposed with respect to said driving member of said shutter means so that said switching element means automatically closes said interrupting switch when the shutter is wound.

13. The photographic camera of claim 11 having a mechanical movement operably connected to actuate said interrupting switch, said mechanical movement being releasable by said driving member of said shutter means to determine the time interval during which said light lights up.

14. The photographic camera of claim 13 wherein a power transmission lever is provided between said shutter driving member and said mechanical movement, said power transmission lever being operably connected to said shutter driving member and said mechanical movement so that when winding the shutter, said lever drives said mechanical movement and serves to bring said movement into the wound position.

15. The photographic camera of claim 9 wherein circuit means is provided to keep said light on for a predetermined interval after said switch means is actuated, said circuit means comprising a first transistor in series with said light to control operating current through said light; a second transistor connected to said first transistor to control the conductivity thereof; resistor means connected to the base of said second transistor; a capacitor and a charging circuit, said switching means being connected to said charging circuit, said capacitor and said resistor means to connect said capacitor to said charging circuit between exposures and to connect said capacitor to said resistor means at the end of the exposure process to control the conductivity of said second transistor and thereby the conductivity of said first transistor for a time interval determined by said capacitor and said resistor means.

References Cited

UNITED STATES PATENTS 3,205,799  9/1965  Burgarella et al.

FOREIGN PATENTS 1,417,458  10/1965  France.

NORTON ANSHER, Primary Examiner

J. F. PETERS, JR., Assistant Examiner

U.S. Cl. X.R.

95—53